(12) United States Patent
Baba et al.

(10) Patent No.: US 7,262,534 B2
(45) Date of Patent: Aug. 28, 2007

(54) MAGNETO-GENERATOR

(75) Inventors: Shinji Baba, Tokyo (JP); Mitsuharu Hashiba, Tokyo (JP); Nobuhiro Kihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 169 days.

(21) Appl. No.: 10/797,102

(22) Filed: Mar. 11, 2004

(65) Prior Publication Data

US 2005/0067914 A1 Mar. 31, 2005

(30) Foreign Application Priority Data

Sep. 29, 2003 (JP) ............... 2003-337658

(51) Int. Cl.
  *H02K 1/14* (2006.01)
  *H02K 1/27* (2006.01)
  *H02K 3/34* (2006.01)
(52) U.S. Cl. ............... 310/153; 310/216; 310/254
(58) Field of Classification Search ............... 310/254, 310/194, 215, 216, 179, 214
See application file for complete search history.

(56) References Cited

U.S. PATENT DOCUMENTS

| | | | | |
|---|---|---|---|---|
| 2,990,112 A | * | 6/1961 | Levy et al. ............. | 416/170 R |
| 3,196,304 A | * | 7/1965 | Koehly et al. ............... | 310/194 |
| 5,220,228 A | * | 6/1993 | Sibata ......................... | 310/254 |
| 5,304,885 A | * | 4/1994 | Wong et al. ................ | 310/216 |
| 5,428,258 A | * | 6/1995 | Mowery ..................... | 310/215 |
| 5,449,963 A | * | 9/1995 | Mok ........................... | 310/270 |
| 5,767,601 A | * | 6/1998 | Uchiyama .................... | 310/191 |
| 5,969,455 A | * | 10/1999 | Sakamoto .................... | 310/194 |
| 6,756,713 B2 | * | 6/2004 | Diehl et al. ................. | 310/254 |
| 7,145,274 B2 | * | 12/2006 | Uemura et al. .............. | 310/74 |
| 7,154,202 B2 | * | 12/2006 | Hashiba et al. ............. | 310/74 |
| 2006/0022545 A1 | * | 2/2006 | Hashiba et al. ............. | 310/179 |
| 2006/0066172 A1 | * | 3/2006 | Takeuchi ..................... | 310/254 |

FOREIGN PATENT DOCUMENTS

| | | |
|---|---|---|
| JP | 53-064704 A | 6/1978 |
| JP | SHO 63-674 A | 1/1988 |
| JP | 6-5351 | 1/1994 |
| JP | HEI 7 16557 A | 3/1995 |
| JP | 09-121517 A | 5/1997 |
| JP | 11-178265 A | 7/1999 |
| JP | 2001-008389 A | 1/2001 |
| JP | 2001-028870 A | 1/2001 |
| JP | 2001-112226 A | 4/2001 |
| JP | 2003-088027 A | 3/2003 |
| JP | 2003-244917 A | 8/2003 |

* cited by examiner

*Primary Examiner*—Burton Mullins
(74) *Attorney, Agent, or Firm*—Sughrue Mion, PLLC

(57) ABSTRACT

Two end plates of a stator core are made of a metal material to increase their rigidity and thereby hold, in a prescribed shape, generation coils that are wound on teeth of the stator core. To increase the insulation between the generation coils and the teeth, the circumferential width of a first portion, extending in the radial direction, of each of the end plates is made smaller than that of a corresponding first portion of a laminated core. At least a second portion of at least one of the two end plates is made of a non-magnetic metal material, whereby the magnetic loss is reduced and the temperature characteristic and the power generation characteristic are improved.

22 Claims, 5 Drawing Sheets

MAGNETO-GENERATOR

BACKGROUND OF THE INVENTION

1. Field of the Invention

The present invention relates to a magneto-generator that is driven by an internal combustion engine, for example.

2. Description of the Related Art

A magneto-motor that is used in a closed compressor is disclosed in JP-A-2001-28870. A technique of reducing ineffective, short-circuited magnetic flux by forming, with a resin as a non-magnetic material, top and bottom end plates of an iron core that is a lamination of magnetic steel plates is described in paragraph 0024 of this reference. Whereas a technique of using magnetic steel plates as the end plates is known, the magnetic loss occurring in the end plates can be reduced by forming the end plates with a resin as a non-magnetic material.

In magneto-generators in general driven by an internal combustion engine, a recent trend is such that the number of magnetic poles is increased to increase the frequency of the output voltage, make its rectified voltage flatter, and increase the output current. In this case, the magnetic loss of the stator core tends to increase with the frequency. It is therefore necessary to minimize the magnetic loss in the end plates.

To reduce the magnetic loss in the end plates, it is important that the end plates be made of a non-magnetic material. Since the generation coils are wound on the teeth of the stator core including the end plates, the end plates should be rigid enough to hold the generation coils in a prescribed shape and should be configured effectively so as to provide sufficient insulation between the stator core and the generation coils.

Among the above requirements, the insulation that is necessary between the stator core and the generation coils can be attained easily by forming the end plates with a resin as in the above prior art technique. In contrast, it is difficult to impart sufficient rigidity to the end plates. One method for imparting sufficient rigidity to the end plates made of a resin is to insert-mold resin plates in such a manner that it incorporates the stator core therein. However, this requires a special insert-molding step. Further, parts of the end plates that are required to be particularly rigid should be thick, which restricts the winding spaces.

SUMMARY OF THE INVENTION

The present invention has been made in view of the above requirements, and an object of the invention is therefore to provide an improved magneto-generator which can reduce the magnetic loss in the end plates and secure the insulation that is necessary between the stator core and the generation coils and in which the end plates are sufficiently rigid.

The invention provides an improved magneto-generator. The improved magneto-generator includes a flywheel, a plurality of magnets, a stator core and a plurality of generation coils. The flywheel has a cylindrical portion and rotates about a rotation axis. The magnets are disposed on an inner circumferential surface of the cylindrical portion of the flywheel and rotate together with the flywheel. The stator core has a laminated core formed by laminating a plurality of magnetic thin plate, the laminated core has an annular portion and a plurality of teeth projecting from the annular portion outward and are opposed to the plurality of magnets. The generation coils are wound on the respective teeth of laminated core. In the magneto-generator, the stator core has two end plates that are made of a metal material and disposed on both sides of the laminated core in such a manner that the laminated core is sandwiched in between. Each of the teeth has a first portion extending in a radial direction and a second portion projecting in a circumferential direction from an outer end of the first portion on both sides thereof. Each of the two end plates has a first portion that is laid on the first portion of each of the teeth and a second portion that is laid on the second portion of each of the teeth. At least the first portion of each of the two end plates is smaller in circumferential width than the first portion of each of the teeth, and at least the second portion of at least one of the two end plates is made of a non-magnetic metal material.

In the magneto-generator according to the invention, the pair of end plates are made of a metal material while the first portion of each end plate is smaller in circumferential width than the first portion of each tooth of laminated core. Therefore, sufficient rigidity can be given to the end plates and the sufficient rigidity allows the end plates to hold, in a prescribed shape, the generation coil that are wound on the first portion of each tooth by stopping the generation coil by the second portion. Further, since the first portion of each end plate is smaller in circumferential width than the first portion of each tooth of laminated core, sufficiently high insulation can be secured between the teeth with the end plates and the generation coil in spite of the fact that the end plates are made of a metal material. Around the edges of the teeth and the end plates, sufficient high insulation can be secured. Further, since at least the second portion of at least one of the end plates is made of a non-magnetic metal material, the magnetic loss of the end plates can be reduced at least in the second portion of each tooth where the magnetic flux density is high. And the temperature increase of the stator core can be reduced and the generated power can be increased.

DESCRIPTION OF THE PREFERRED EMBODIMENTS

Several embodiments of the present invention will be hereinafter described with reference to the drawings.

Embodiment 1

Figure 1:
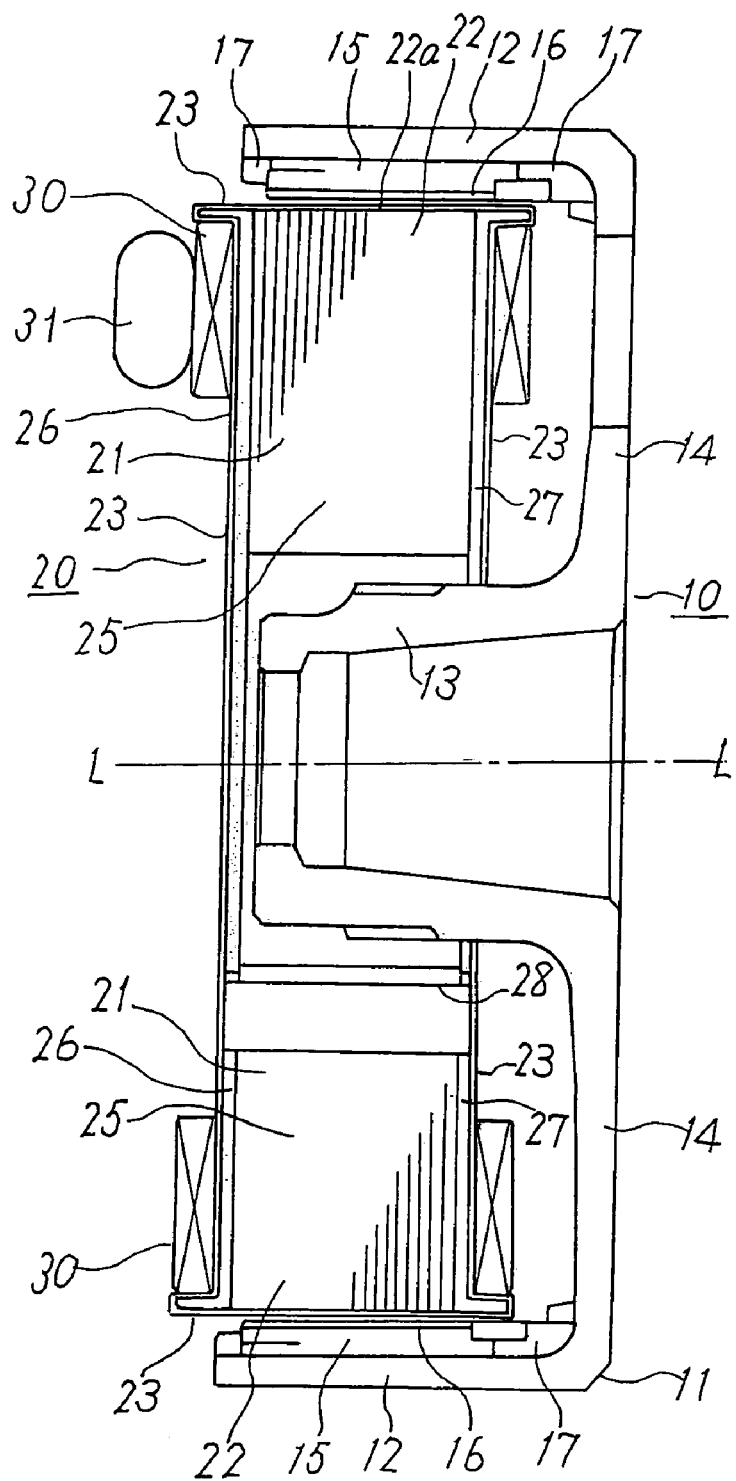
FIG. 1 is a vertical sectional view of a magneto-generator according to a first embodiment of the present invention.
Figure 2:
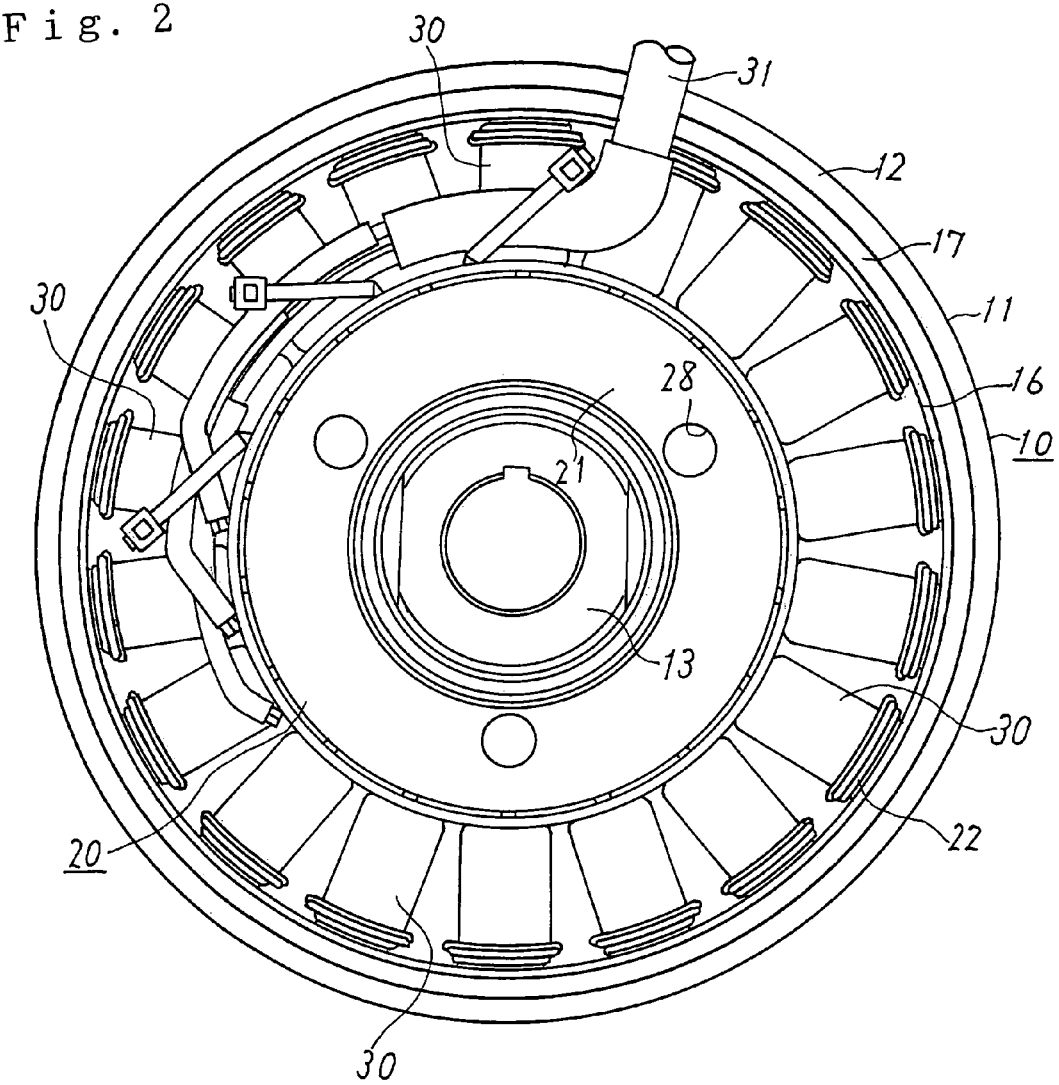
FIG. 2 is a left-hand side view of the magneto-generator of FIG. 1.

FIG. 1 is a vertical sectional view of a magneto-generator according to the first embodiment of the invention, and FIG. 2 is its left-hand side.

The magneto-generator according to the first embodiment is a flywheel magneto-generator which is mounted on a two-wheeled vehicle, an outboard machine, a snowmobile, or the like and is used for charging a battery, supplying power to various loads, and other purposes when driven by its internal combustion engine or the like.

The flywheel magneto-generator according to the first embodiment is equipped with a rotor 10 and a stator 20.

The rotor 10 has a bowl-shaped flywheel 11, which includes an outer cylindrical portion 12, an inner boss portion 13, and a bottom portion 14 that connects the cylindrical portion 12 and the boss portion 13. The flywheel 11 rotates about a rotation axis L-L. The boss portion 13 is fixed to a rotary shaft that is driven by an internal combustion engine (not shown).

A plurality of permanent magnets 15 are fixed to the inner circumferential surface of the cylindrical portion 12 of the flywheel 11. The permanent magnets 15 are arranged around the rotation axis L-L at regular angular intervals. In the first embodiment, in order to accommodate a recent trend of increase in the number of poles, the plurality of permanent magnets 15 are arranged in the inner circumferential surface of the cylindrical portion 12. Adjoining ones of the permanent magnets 15 are magnetized in opposite polarities, whereby a magnetic field whose direction varies alternately is generated in the space inside the permanent magnets 15.

A cylindrical protective ring 16 is tightly fitted in the permanent magnets 15. A resin or a molding material 17 is filled into portions adjacent to both ends (in the direction of the axis L-L) of the permanent magnets 15 and the gaps between the permanent magnets 15, whereby the permanent magnets 15 and the protective ring 16 are fixed to the inner circumferential surface of the flywheel 11.

The stator 20, which is attached to a fixing member (not shown), has a stator core 21 and generation coils 30. Having an annular shape, the stator core 21 is disposed so as to surround the axis L-L. The annular stator core 21 is formed with a plurality of teeth 22 that project outward. That is, in this embodiment, to accommodate the recent trend of increase in the number of poles of the permanent magnets 15, the teeth 22 are arranged around the axis L-L at regular angular intervals.

The projection end of each tooth 22 is formed with a circular-arc-shaped (in cross-section) surface 22a that is opposed to the protective ring 16 with a very narrow space interposed in between. The generation coils 30 are wound on the circumferential surfaces of the teeth 22, respectively. As shown in FIG. 2, the generation coils 30 are connected to each other by connection leads 31. An output voltage of the generation coils 30 is rectified by rectification diodes and a rectified voltage is supplied to a load such as a vehicle battery.

As shown in FIG. 1, the outer surface of each tooth 22 is coated with an insulating film 23, which is formed by painting of an epoxy resin powder, for example. Each insulating film 23 serves for electrical insulation between the tooth 22 and the generation coil 30 wound thereon.

As shown in FIG. 1, the stator core 21 having the teeth 22 is composed of a laminated core 25 formed by laminating thin magnetic steel plates in the direction of the axis L-L and a pair of end plates 26 and 27 located on both sides of the laminated core 25. The laminated core 25 is made of a magnetic metal material; for example, it is formed by laminating a large number of thin cold-rolled steel plates in the direction of the axis L-L. The end plates 26 and 27 are made of a non-magnetic metal material; for example, they are thin stainless plates (e.g., SUS 304) having the same thickness. The end plates 26 and 27 are located on both sides, in the direction of the axis L-L, of the laminated core 25 so as to be in close contact with it. That is, the laminated core 25 is sandwiched between the end plates 26 and 27 in the direction of the axis L-L. Through-holes 28 are formed through the laminated core 25 and the end plates 26 and 27 at inside positions so as to extend parallel with the axis L-L. The laminated core 25 and the end plates 26 and 27 are integrated with each other by bolts or the like that are inserted into the through-holes 28.

The end plates 26 and 27, which are made of a metal material, are much more rigid than end plates made of an insulative material and hence are effective in allowing the generation coils 30 to be wound thereon and held in a prescribed shape. Further, made of a non-magnetic metal material, the end plates 26 and 27 are effective in reducing the hysteresis loss and the eddy current loss even with a large number of poles. In particular, since magnetic flux is concentrated in the end plates 26 and 27 because they are located at both ends of the teeth 22, their effect of reducing the hysteresis loss and the eddy current loss is remarkable.

Figure 3:
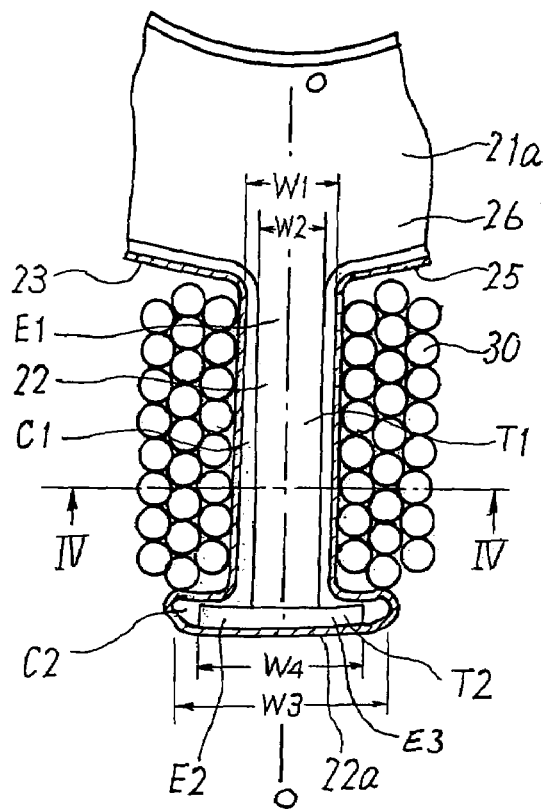
FIG. 3 is a side view of one tooth of a stator core and one generation coil wound thereon in the first embodiment.
Figure 4:
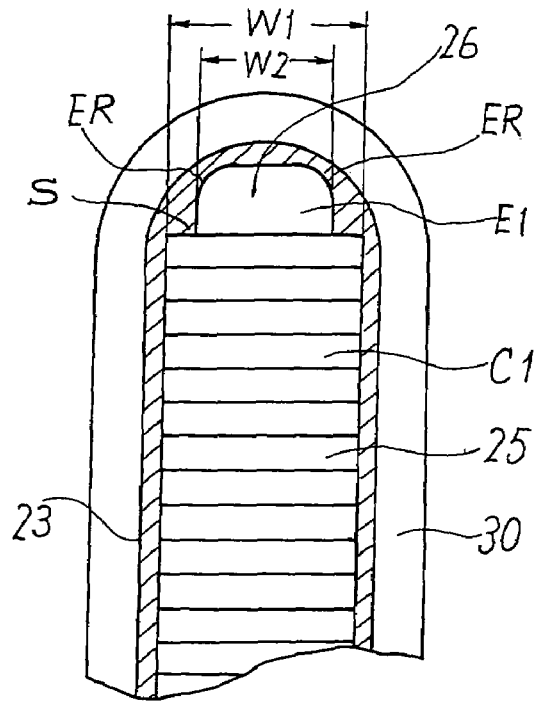
FIG. 4 is a sectional view taken along line IV-IV in FIG. 3.

FIG. 3 is a side view of one tooth 22 and one generation coil 30 wound thereon. In FIG. 3, the generation coil 30 and the insulating film 23 are drawn in cross-section. FIG. 4 is a sectional view taken along line IV-IV in FIG. 3. Although one tooth 22 and one generation coil 30 are shown in FIGS. 3 and 4, the other teeth 22 and generation coils. 30 are configured in the same manners as shown in FIGS. 3 and 4.

As shown in FIG. 3, the center line O-O of the tooth 22 extends from the rotation axis L-L outward in the radial direction.

As shown in FIG. 3, the stator core 21 has an annular portion 21a that surrounds the axis L-L and the tooth 22 projects from the annular portion 21a outward along the center line O-O. The tooth 22 has a first portion T1 that extends in the radial direction along the center line O-O and a second portion T2 that projects from the outer end of the first portion T1 on both sides in the circumferential direction around the axis L-L.

The second portion T2 of the tooth 22 is formed with a circular-arc-shaped surface 22a that is opposed to the inner circumferential surface of the permanent magnets 15 which are fixed to the flywheel 11. The generation coil 30 is wound on the outer surface of the first portion T1 of the tooth 22 so as to surround the first portion T1. The insulating film 23 which is a coating on the outer surface of the tooth 22 exists between the generation coil 30 and the tooth 22 and serves for electrical insulation between the generation coil 30 and the tooth 22. The generation coil 30 is wound on the outer surface of the first portion T1, that is, it is wound in the restricted range between the annular portion 21a and the second portion T2 which projects from the first portion T1. As shown in FIG. 4, in an end portion, in the direction of the axis L-L, of the tooth 22, the generation coil 30 is wound on the end plates 26 and 27; the generation coil 30 is wound and held in a prescribed shape by virtue of their rigidity.

The laminated core 25 has first portions C1 and second portions C2 that correspond to the first portion T1 and the second portion T2 of the tooth 22, respectively. The first portion C1 and the second portion C2 of each steel plate are integral with each other. Each of the end plates 26 and 27 has a first portion E1 and a second portion E2 that coextend with the first portions C1 and the second portions C2 of the laminated core 25, respectively. The second portion E2 of each of the end plates 26 and 27 has a projection E3 that projects from the laminated core 25 along the axis L-L. The projections E3 prevent the generation coil 30 from going outward and losing its shape. By virtue of their rigidity, the projections E3 hold the outer end portion of the generation coil 30 which is wound on the tooth 22 so that the outer portion of the generation coil 30 assumes a prescribed shape inside the projections E3.

The first portions C1 of the laminated core 25 have a circumferential width W1 (see FIGS. 3 and 4). The large number of magnetic thin plates to constitute the laminated core 25 are formed by punching so that all of their first portions C1 have the same circumferential width W1 and are then laminated together. The first portions E1 of the end plates 26 and 27 have a circumferential width W2 that is smaller than the circumferential width W1 of the first portions C1 of the laminated core 25, that is, a relationship W1>W2 holds. Although only the end plate 26 is shown in FIGS. 3 and 4, the end plate 27 is configured in the same manner as the end plate 26. The first portions E1 of the end plates 26 and 27 are located on both sides of and laid on the first portions C1 of the laminated core 25 so as to be placed within the circumferential width W1 of the first portions C1 of the laminated core 25.

The second portions C2 of the laminated core 25 has a circumferential width W3 (see FIGS. 3 and 4) that is greater than the circumferential width W1 of the first portions C1, that is, a relationship W3>W1 holds. The large number of magnetic thin plates to constitute the laminated core 25 are formed by punching so that all of their second portions C2 have the same circumferential width W3 and are then laminated together. The second portions E2 of the end plates 26 and 27 have a circumferential width W4 that is smaller than the circumferential width W3 of the second portions C2 of the laminated core 25, that is, a relationship W3>W4 holds. The second portions E2 of the end plates 26 and 27 are located on both sides of and laid on the second portions C2 of the laminated core 25 so as to be placed within the circumferential width W3 of the second portions C2 of the laminated core 25.

The end plates 26 and 27 are made of the same material; for example, they are thick stainless plates. The first portion E1, the second portion E2, and the projection E3 of each of the end plates 26 and 27 are integral with each other and are a single stainless plate.

The edges of the end plates 26 and 27 that are distant from the laminated core 25 are chamfered into round edges ER. As shown in FIG. 4, the generation coil 30 is wound on the round edges ER. The round edges ER formed by chamfering (i.e., working such as stamping, cutting, or the like for rounding an angled portion) increase the insulation from the generation coil 30. In addition, as shown in FIG. 4, because of the relationship W1>W2, steps S are formed between the edges ER of the end plate 26 and the laminated core 25. Similar steps S are formed for the end plate 27. As shown in FIG. 4, the outer surface of the tooth 22 is coated with the insulating film 23 in such a manner that the steps S are completely covered with the insulating film 23. The steps S prevent the end plates 26 and 27 from extending to the ends of the laminated core 25 and thereby increase the insulation from the generation coil 30. The steps S increase the amount of the insulative material (insulating film 23) near the edges of the tooth 22 and thereby increase the insulation from the generation coil 30. Because of its tension, the generation coil 30 is wound on the tooth 22 so as to take a shortest route and cut into the insulating film 23. The steps S is effective in increasing the insulation from the generation coil 30 even in such a situation.

As described above, in the flywheel magneto-generator according to the first embodiment, the end plates 26 and 27 are made of a metal material while having the circumferential width W2 that is smaller than the circumferential width W1 of the laminated core 25 at least in the first portion T1 of each tooth 22. Therefore, sufficient rigidity can be given to the end plates 26 and 27 and the sufficient rigidity allows the end plates 26 and 27 to hold, in a prescribed shape, the generation coil 30 that is wound on the first portion T1. Further, since the end plates 26 and 27 have the circumferential width W2 that is smaller than the circumferential width W1 of the laminated core 25 at least in the first portion T1, sufficiently high insulation can be secured between the tooth 22 (including the edges ER of the end plates 26 and 27) and the generation coil 30 in spite of the fact that the end plates 26 and 27 are made of a metal material. Further, since the end plates 26 and 27 are made of a non-magnetic metal material, the magnetic loss of the end plates 26 and 27 due to the increase in the number of poles can be reduced at least in the second portion T2 where the magnetic flux density is high. And the temperature increase of the stator core 21 can be reduced and the generated power can be increased.

Figure 5:
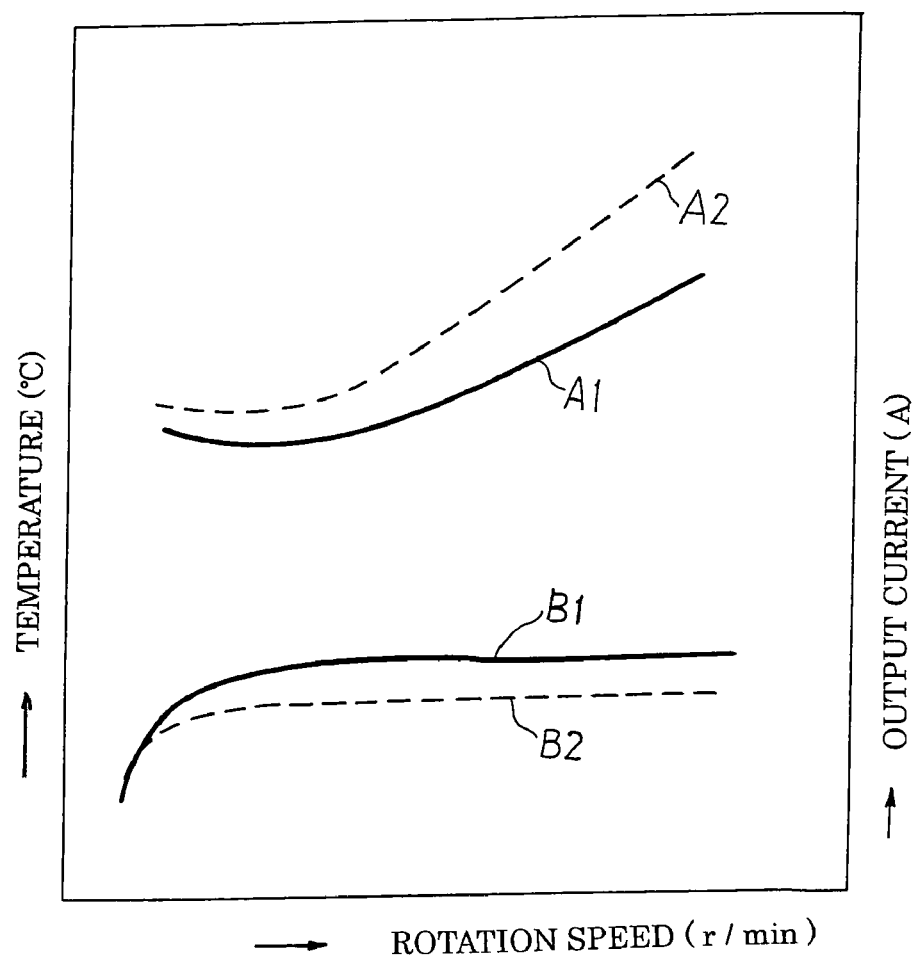
FIG. 5 is a graph showing a temperature characteristic and a power generation characteristic in the first embodiment.

FIG. 5 shows a temperature characteristic (i.e., heat generation characteristic) A1 of the stator core 21 and a power generation characteristic (i.e., output current characteristic) B1 of the generation coils 30 of the flywheel magneto-generator according to the first embodiment. In FIG. 5, the horizontal axis represents the drive rotation speed (r/min) of the flywheel magneto-generator, the left-hand vertical axis represents the temperature (° C.) of the stator core 21, and the right-hand vertical axis represents the output current (A) of the generation coils 30. For comparison, FIG. 5 also shows a temperature characteristic A2 and a power generation characteristic B2 of a flywheel magneto-generator of a comparative example in which the end plates 26 and 27 are made of the same magnetic material as the laminated core 25, that is, cold-rolled steel plates and the circumferential widths W2 and W4 of the end plates 26 and 27 are equal to the circumferential widths W1 and W3 of the laminated core 25, respectively, that is, W2=W1 and W4=W3. According to the first embodiment, the temperature (characteristic A1) is lower than in the comparative example (characteristic A2) approximately over the entire drive rotation speed range. And the output current (characteristic B1) is higher than in the comparative example (characteristic B2). The comparative example is the same as the first embodiment except for the end plates 26 and 27.

Embodiment 2

Figure 6:
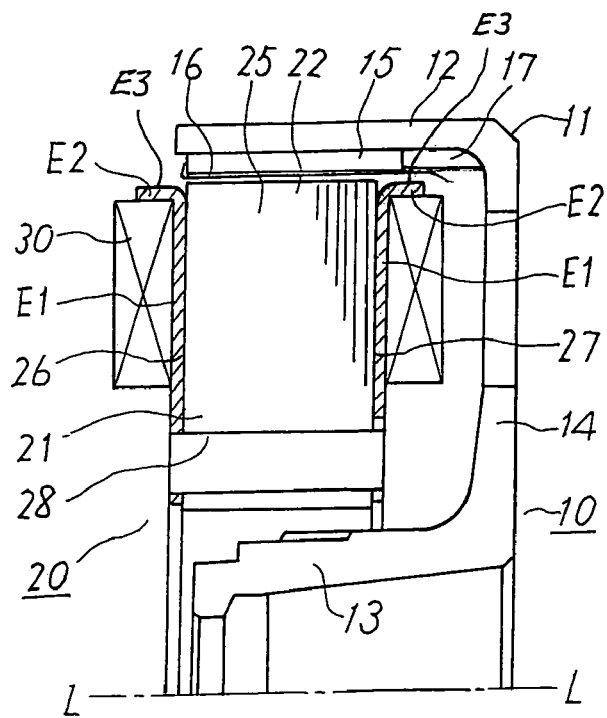
FIG. 6 is a vertical sectional view of part of a magneto-generator according to a second embodiment of the invention.

FIG. 6 shows a flywheel magneto-generator according to a second embodiment of the invention. FIG. 6 is a vertical sectional view of an upper half (above the rotation axis L-L) of the flywheel magneto-generator according to the second embodiment. In the second embodiment, the first portion E1 of each of the end plates 26 and 27 is made of a magnetic metal material such as cold-rolled steel and the second portion E2 and the projection E3 are made of a non-magnetic metal material such as stainless steel (SUS 304). The second portion E2 having the projection E3 is fixed to the outer end of the first portion E1 by welding, for example. Although the insulating film 23 is omitted in FIG. 6, the outer surfaces of the teeth 22 are coated with the insulating film 23 as in the case of the first embodiment. The second embodiment is the same as the first embodiment in the other part of the configuration.

In the second embodiment, as in the first embodiment, the circumferential width W2 of the first portions E1 of the end plates 26 and 27 is smaller than the circumferential width W1 of the first portions C1 of the laminated core 25 and the circumferential width W4 of the second portions E2 of the end plates 26 and 27 is smaller than the circumferential width W3 of the second portions C2 of the laminated core 25, as a result of which the same advantages as of the first embodiment can be obtained. Since in the end plates 26 and 27 the second portions E2 where magnetic flux is concentrated particularly are stainless steel plates, the temperature increase in the stator core 21 can be reduced as in the case of the first embodiment.

Embodiment 3

Figure 7:
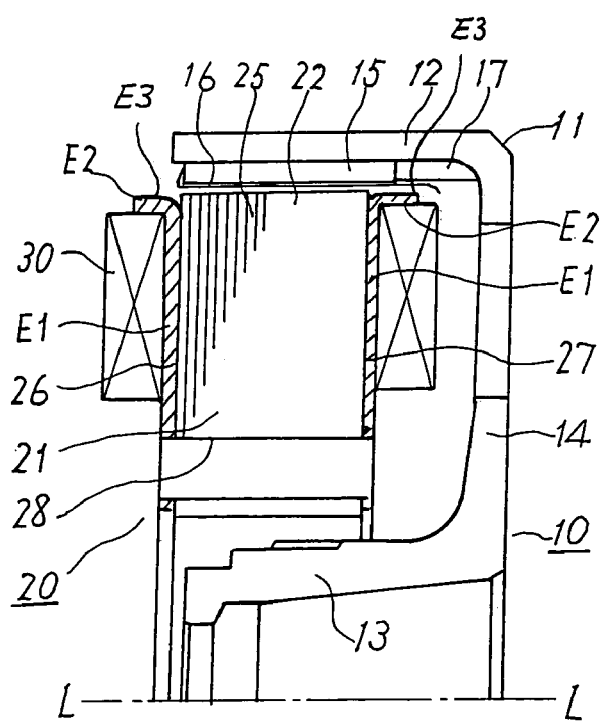
FIG. 7 is a vertical sectional view of part of a magneto-generator according to a third embodiment of the invention.

FIG. 7 shows a flywheel magneto-generator according to a third embodiment of the invention. FIG. 7 is a vertical sectional view of an upper half (above the rotation axis L-L) of the flywheel magneto-generator according to the third embodiment. In the third embodiment, the end plates 26 and 27 are made of different non-magnetic metal materials. More specifically, the first portion E1, the second portion E2, and the projection E3 of the end plate 26 are made of one non-magnetic metal material such as aluminum and those of the end plate 27 are made of another non-magnetic metal material such as stainless steel (SUS 304). Since aluminum is less rigid than stainless steel, the end plate 26 is made thicker than the end plate 27 so as to have approximately the same degree of rigidity as the latter. An aluminum plate can be shaped more easily than a stainless steel plate. Although the insulating film 23 is omitted in FIG. 7, the outer surfaces of the teeth 22 are coated with the insulating film 23 as in the case of the first embodiment. The third embodiment is the same as the first embodiment in the other part of the configuration.

In the third embodiment, as in the first embodiment, the circumferential width W2 of the first portions E1 of the end plates 26 and 27 is smaller than the circumferential width W1 of the first portions C1 of the laminated core 25 and the circumferential width W4 of the second portions E2 of the end plates 26 and 27 is smaller than the circumferential width W3 of the second portions C2 of the laminated core 25, as a result of which the same advantages as of the first embodiment can be obtained.

The magneto-generator according to the invention is mounted on a two-wheeled vehicle, an outboard machine, a snowmobile, or the like and is used for charging a battery, supplying power to various loads, and other purposes when driven by its internal combustion engine or the like.

What is claimed is:

1. A magneto-generator comprising:
    a flywheel having a cylindrical portion and rotating about a rotation axis;
    a plurality of magnets disposed on an inner circumferential surface of the cylindrical portion of the flywheel and rotating together with the flywheel;
    a stator core having a laminated core formed by laminating a plurality of magnetic thin plate, the laminated core having an annular portion and a plurality of teeth projecting from the annular portion outward and opposed to the plurality of magnets; and
    a plurality of generation coils, each of generation coils wound on the respective teeth of the laminated core, wherein:
    the stator core has two end plates that are made of a metal material and disposed on both sides of the laminated core in such a manner that the laminated core is sandwiched in between;
    each of the teeth of the laminated core has a first portion extending in a radial direction and a second portion projecting in a circumferential direction from an outer end of the first portion on both sides thereof;
    each of the two end plates has a first portion that is laid on the first portion of each of the teeth and a second portion that is laid on the second portion of each of the teeth, at least the first portion of each of the two end plates is smaller in circumferential width than the first portion of each of the teeth,
    the second portion of at least one of the two end plates has a projection portion that projects only from the second portion of a respective tooth, and
    at least the second portion of at least one of the two end plates is made of a non-magnetic metal material.

2. The magneto-generator according to claim 1, wherein the second portion of each of the two end plates has a projection that projects parallel with the rotation axis.

3. The magneto-generator according to claim 2, wherein at least the second portions of both end plates are made of the non-magnetic metal material.

4. The magneto-generator according to claim 2, wherein the non-magnetic metal material is stainless steel.

5. The magneto-generator according to claim 1, wherein at least the second portions of both end plates are made of the non-magnetic metal material.

6. The magneto-generator according to claim 5, wherein the non-magnetic metal material is stainless steel.

7. The magneto-generator according to claim 1, wherein the non-magnetic metal material is stainless steel.

8. The magneto-generator according to claim 1, wherein the first and second portions of both end plates are made of the non-magnetic metal material.

9. The magneto-generator according to claim 8, wherein the non-magnetic metal material is stainless steel.

10. The magneto-generator according to claim 8, wherein the one of the two end plates is thinner than the other.

11. The magneto-generator according to claim 10, wherein the one end plate is made of stainless steel and the other end plate is made of aluminum.

12. The magneto-generator according to claim 1, wherein an outer surface of each of the teeth of the laminated core and the two end plates are coated with an insulating film and each of the generation coils is wound on the insulating film.

13. The magneto-generator according to claim 1, wherein the first portion, the second portion, and the projection portion of the at least one of the two end plates are integrally formed.

14. The magneto-generator according to claim 1, wherein at least the second portion of each of the two end plates is smaller in circumferential width than the second portion of each of the teeth.

15. A magneto-generator comprising:
    a rotor rotating about a rotation axis and including a cylindrical portion and a plurality of magnets disposed on an inner circumferential surface of the cylindrical portion;
    a stator core including a plurality of teeth opposed to the plurality of magnets, the stator core has a laminated core formed by laminating a plurality of magnetic thin plates, and two end plates disposed on both ends of the laminated core in such manner that the laminated core is sandwiched in between; and
    a plurality of generation coils, each of the generation coils wound on the respective teeth of the stator, wherein:
each of the teeth of the laminated core has a first portion extending in a radial direction and a second portion projecting in a circumferential direction from an outer end of the first portion on both sides thereof,
each of the two end plates is made of a non-magnetic metal material and has a first portion that is laid on the first portion of each of the teeth and a second portion that is laid on the second portion of each of the teeth, and
the second portion of at least one of the two end plates has a projection portion that projects only from the second portion of a respective tooth in a direction along the rotating axis.

16. The magneto-generator according to to claim 15, wherein the non-magnetic metal material is stainless steel.

17. A magneto-generator comprising:
a rotor rotating about a rotation axis and including a cylindrical portion and a plurality of magnets disposed on an inner circumferential surface of the cylindrical portion;
a stator core including a plurality of teeth opposed to the plurality of magnets, the stator core has a laminated core formed by laminating a plurality of magnetic thin plates, and two end plates disposed on both ends of the laminated core in such manner that the laminated core is sandwiched in between; and
a plurality of generation coils, each of the generation coils wound on the respective teeth of the stator,
wherein:
each of the teeth of the laminated core has a first portion extending in a radial direction and a second portion projecting in a circumferential direction from an outer end of the first portion on both sides thereof,
each of the two end plates is made of a non-magnetic metal material and has a first portion that is laid on the first portion of each of the teeth and a second portion that is laid on the second portion of each of the teeth,
the second portion of at least one of the two end plates has a projection portion that projects only from the second portion of a respective tooth, and
edges of at least the first portion of each of the two end plates that are distant from the laminated core are chamfered.

18. The magneto-generator according to to claim 17, wherein the non-magnetic metal material is stainless steel.

19. A magneto-generator comprising:
a rotor rotating about a rotation axis and including a cylindrical portion and a plurality of magnets disposed on an inner circumferential surface of the cylindrical portion;
a stator core including a plurality of teeth opposed to the plurality of magnets, the stator core has a laminated core formed by laminating a plurality of magnetic thin plates, and two end plates disposed on both ends of the laminated core in such a manner that the laminated core is sandwiched in between; and
a plurality of generation coils, each of the generation coils wound on the respective teeth of the stator core, wherein:
each of the teeth of the laminated core has a first portion extending in a radial direction and a second portion projecting in a circumferential direction from an outer end of the first portion on both sides thereof,
each of the two end plates has a first portion that is laid on the first portion of each of the teeth and a second portion that is laid on the second portion of each of the teeth,
the second portion of at least one of the two end plates has a projection portion that projects only from the second portion of a respective tooth,
a circumferential width of each of the first portion of each of the two end plates is smaller than the circumferential width of each of the first portions of each of the teeth,
a circumferential width of each of the second portion of each of the two end plates is smaller than the circumferential width of each of the second portions of each of the teeth, and
at least the second portion of at least one of the two end plates is made of a non-magnetic metal material.

20. The magneto-generator according to claim 19, wherein edges of each of the two end plates that are distant from the laminated core are chamfered.

21. A magneto-generator comprising:
a rotor rotating about a rotation axis and including a cylindrical portion and a plurality of magnets disposed on an inner circumferential surface of the cylindrical portion;
a stator core including a plurality of teeth opposed to the plurality of magnets, the stator core has a laminated core formed by laminating a plurality of magnetic thin plates, and two end plates disposed on both ends of the laminated core in such a manner that the laminated core is sandwiched in between; and
a plurality of generation coils, each of the generation coils wound on the respective teeth of the stator core,
wherein:
each of the teeth of the laminated core has a first portion extending in a radial direction and a second portion projecting in a circumferential direction from an outer end of the first portion on both sides thereof,
each of the two end plates has a first portion that is laid on the first portion of each of the teeth and a projection portion projecting in a direction along the rotating axis from an outer end of the first portion thereof,
a circumferential width of each of the projection portions of each of the two end plates is larger than the circumferential width of each of the first portions of each of the teeth, and
each of the projection portions of the two end plates is made of a non-magnetic metal material.

22. The magneto-generator according to claim 21, wherein edges of each of the two end plates that are distant from the laminated core are chamfered.

* * * * *